(12) United States Patent
Li et al.

(10) Patent No.: US 9,900,906 B2
(45) Date of Patent: Feb. 20, 2018

(54) METHOD, APPARATUS, AND COMPUTER READABLE MEDIUM FOR MULTI-USER SCHEDULING IN WIRELESS LOCAL-AREA NETWORKS

(71) Applicant: Intel IP Corporation, Santa Clara, CA (US)

(72) Inventors: Guoqing C. Li, Portland, OR (US); Shahrnaz Azizi, Cupertino, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/026,022

(22) PCT Filed: Nov. 18, 2014

(86) PCT No.: PCT/US2014/066133
§ 371 (c)(1),
(2) Date: Mar. 30, 2016

(87) PCT Pub. No.: WO2015/077223
PCT Pub. Date: May 28, 2015

(65) Prior Publication Data
US 2016/0227572 A1 Aug. 4, 2016

Related U.S. Application Data

(60) Provisional application No. 61/906,059, filed on Nov. 19, 2013, provisional application No. 61/973,376, (Continued)

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0094* (2013.01); *H04L 27/2602* (2013.01);
(Continued)

(58) Field of Classification Search
None
See application file for complete search history.

(56) References Cited

U.S. PATENT DOCUMENTS 7,809,020 B2 10/2010 Douglas et al.
8,395,997 B2 * 3/2013 Banerjea ............... H04W 72/04
370/241

(Continued)

FOREIGN PATENT DOCUMENTS

CN 101433018 A 5/2009
CN 105379217 A 3/2016
(Continued)

OTHER PUBLICATIONS

U.S. Appl. No. 15/052,600, filed Feb. 24, 2016, Wireless Apparatus for High-Efficiency (HE) Communication With Additional Subcarriers.

(Continued)

*Primary Examiner* — Hong Cho
(74) *Attorney, Agent, or Firm* — Schwegman Lundberg & Woessner, P.A.

(57) ABSTRACT

Methods, apparatuses, and computer readable media are shown for multi-user scheduling in wireless local-area networks (WLANs). A wireless communication device is shown including circuitry to determine a plurality of schedules for each of a plurality of channels for an orthogonal frequency division multiple access (OFDMA) communication in a wireless local-area network (WLAN). Each of the plurality of schedules may include a frequency allocation for one or more communication devices. The circuitry may be (Continued)

further configured to transmit the corresponding schedule of the one or more schedules on each of the one or more channels. Each of the plurality of schedules may include a schedule type and a user association identification (AID) list. A number of user AIDs in the user AID list may be based on the schedule type.

26 Claims, 7 Drawing Sheets

Related U.S. Application Data filed on Apr. 1, 2014, provisional application No. 61/976,951, filed on Apr. 8, 2014, provisional application No. 61/986,256, filed on Apr. 30, 2014, provisional application No. 62/024,801, filed on Jul. 15, 2014, provisional application No. 61/986,250, filed on Apr. 30, 2014, provisional application No. 61/991,730, filed on May 12, 2014.

(51) Int. Cl.
  *H04L 27/26* (2006.01)
  *H04W 72/04* (2009.01)
  *H04W 84/12* (2009.01)

(52) U.S. Cl.
  CPC ........ *H04W 72/0453* (2013.01); *H04W 72/12* (2013.01); *H04W 84/12* (2013.01)

(56) References Cited

U.S. PATENT DOCUMENTS

| | | | |
|---|---|---|---|
| 8,509,323 B2 | 8/2013 | Nangia et al. | |
| 8,560,009 B2 | 10/2013 | Etemad | |
| 8,948,064 B2 | 2/2015 | Shahar | |
| 8,989,158 B2 | 3/2015 | Seok | |
| 9,160,503 B2 * | 10/2015 | Kim | H04L 1/0003 |
| 9,271,241 B2 | 2/2016 | Kenney et al. | |
| 9,325,463 B2 | 4/2016 | Azizi et al. | |
| 9,450,725 B2 | 9/2016 | Azizi et al. | |
| 9,544,914 B2 | 1/2017 | Azizi et al. | |
| 9,648,620 B2 | 5/2017 | Tandra | |
| 2004/0146117 A1 | 7/2004 | Subramaniam et al. | |
| 2005/0135410 A1 | 6/2005 | Stephens | |
| 2005/0276347 A1 | 12/2005 | Mujtaba et al. | |
| 2006/0018249 A1 | 1/2006 | Shearer et al. | |
| 2006/0030322 A1 | 2/2006 | Kim et al. | |
| 2006/0062314 A1 | 3/2006 | Palin et al. | |
| 2006/0067415 A1 | 3/2006 | Mujtaba | |
| 2007/0014375 A1 | 1/2007 | Nakao | |
| 2007/0060161 A1 | 3/2007 | Chindapol et al. | |
| 2007/0147226 A1 | 6/2007 | Khandekar et al. | |
| 2007/0147521 A1 | 6/2007 | Horng et al. | |
| 2007/0153929 A1 | 7/2007 | Ballentin et al. | |
| 2007/0202816 A1 | 8/2007 | Zheng | |
| 2007/0207742 A1 | 9/2007 | Kim et al. | |
| 2008/0013496 A1 | 1/2008 | Dalmases et al. | |
| 2008/0188232 A1 | 8/2008 | Park et al. | |
| 2008/0232339 A1 | 9/2008 | Yang et al. | |
| 2008/0240018 A1 | 10/2008 | Xue et al. | |
| 2008/0240275 A1 | 10/2008 | Cai | |
| 2009/0122882 A1 | 5/2009 | Mujtaba | |
| 2009/0270109 A1 | 10/2009 | Wang Helmersson et al. | |
| 2009/0310692 A1 | 12/2009 | Kafle et al. | |
| 2010/0046671 A1 | 2/2010 | Ali et al. | |
| 2010/0067480 A1 | 3/2010 | Wang et al. | |
| 2010/0080312 A1 | 4/2010 | Moffatt et al. | |
| 2010/0091673 A1 | 4/2010 | Sawai et al. | |
| 2010/0107042 A1 | 4/2010 | Sawai et al. | |
| 2010/0110804 A1 | 5/2010 | Yeh | |
| 2010/0157956 A1 | 6/2010 | Takahashi | |
| 2010/0157970 A1 | 6/2010 | Gotman et al. | |
| 2010/0220679 A1 | 9/2010 | Abraham et al. | |
| 2010/0246375 A1 | 9/2010 | Orlik et al. | |
| 2010/0246539 A1 | 9/2010 | Guillouard et al. | |
| 2010/0260159 A1 | 10/2010 | Zhang et al. | |
| 2010/0309834 A1 | 12/2010 | Fischer et al. | |
| 2010/0322166 A1 | 12/2010 | Sampath et al. | |
| 2011/0013608 A1 | 1/2011 | Lee et al. | |
| 2011/0026623 A1 | 2/2011 | Srinivasa et al. | |
| 2011/0032850 A1 | 2/2011 | Cai | |
| 2011/0038441 A1 | 2/2011 | Shi | |
| 2011/0063991 A1 | 3/2011 | Sampath et al. | |
| 2011/0085513 A1 | 4/2011 | Chen et al. | |
| 2011/0096685 A1 | 4/2011 | Lee et al. | |
| 2011/0110454 A1 | 5/2011 | Sampath et al. | |
| 2011/0116401 A1 | 5/2011 | Banerjea et al. | |
| 2011/0149882 A1 | 6/2011 | Gong et al. | |
| 2011/0194544 A1 | 8/2011 | Yang et al. | |
| 2011/0206156 A1 | 8/2011 | Lee et al. | |
| 2011/0222486 A1 | 9/2011 | Hart | |
| 2011/0235593 A1 | 9/2011 | Gong et al. | |
| 2011/0243025 A1 * | 10/2011 | Kim | H04L 5/0023 370/252 |
| 2011/0249660 A1 | 10/2011 | Noh et al. | |
| 2011/0261708 A1 | 10/2011 | Grandhi | |
| 2011/0261769 A1 | 10/2011 | Ji et al. | |
| 2011/0299474 A1 | 12/2011 | Li et al. | |
| 2011/0305296 A1 | 12/2011 | Van Nee | |
| 2012/0002756 A1 | 1/2012 | Zhang et al. | |
| 2012/0063433 A1 | 3/2012 | Wentink | |
| 2012/0106362 A1 | 5/2012 | Reumerman et al. | |
| 2012/0106481 A1 | 5/2012 | Cho et al. | |
| 2012/0127940 A1 | 5/2012 | Lee et al. | |
| 2012/0155444 A1 | 6/2012 | Chiueh et al. | |
| 2012/0170563 A1 | 7/2012 | Abraham et al. | |
| 2012/0201213 A1 | 8/2012 | Banerjea et al. | |
| 2012/0218983 A1 | 8/2012 | Noh et al. | |
| 2012/0243485 A1 | 9/2012 | Merlin et al. | |
| 2012/0269124 A1 | 10/2012 | Porat | |
| 2012/0275446 A1 | 11/2012 | Stacey et al. | |
| 2012/0314697 A1 | 12/2012 | Noh et al. | |
| 2012/0320890 A1 | 12/2012 | Zhang et al. | |
| 2012/0324315 A1 | 12/2012 | Zhang et al. | |
| 2012/0327870 A1 | 12/2012 | Grandhi et al. | |
| 2012/0327915 A1 | 12/2012 | Kang et al. | |
| 2013/0070642 A1 | 3/2013 | Kim et al. | |
| 2013/0136075 A1 | 5/2013 | Yu et al. | |
| 2013/0142155 A1 | 6/2013 | Trainin et al. | |
| 2013/0177090 A1 | 7/2013 | Yang et al. | |
| 2013/0188572 A1 | 7/2013 | Cheong et al. | |
| 2013/0229996 A1 | 9/2013 | Wang et al. | |
| 2013/0230035 A1 | 9/2013 | Grandhi et al. | |
| 2013/0235720 A1 | 9/2013 | Wang et al. | |
| 2013/0250940 A1 | 9/2013 | Parlamas | |
| 2013/0258975 A1 | 10/2013 | Krishnamurthy et al. | |
| 2013/0265907 A1 | 10/2013 | Kim et al. | |
| 2013/0286925 A1 | 10/2013 | Fischer et al. | |
| 2013/0286959 A1 | 10/2013 | Lou et al. | |
| 2013/0301551 A1 | 11/2013 | Ghosh et al. | |
| 2013/0301563 A1 | 11/2013 | Gupta et al. | |
| 2014/0010196 A1 | 1/2014 | Shapira | |
| 2014/0016607 A1 | 1/2014 | Hart | |
| 2014/0112274 A1 | 4/2014 | Moon et al. | |
| 2014/0211775 A1 | 7/2014 | Sampath et al. | |
| 2014/0307650 A1 | 10/2014 | Vermani et al. | |
| 2015/0023335 A1 | 1/2015 | Vermani et al. | |
| 2015/0063255 A1 | 3/2015 | Tandra et al. | |
| 2015/0063318 A1 | 3/2015 | Merlin et al. | |
| 2015/0117428 A1 | 4/2015 | Lee et al. | |
| 2015/0124745 A1 | 5/2015 | Tandra et al. | |
| 2015/0131517 A1 * | 5/2015 | Chu | H04W 72/005 370/312 |
| 2015/0131756 A1 | 5/2015 | Suh et al. | |
| 2015/0139090 A1 | 5/2015 | Stephens et al. | |
| 2015/0139091 A1 | 5/2015 | Azizi et al. | |
| 2015/0139118 A1 | 5/2015 | Azizi et al. | |
| 2015/0139119 A1 | 5/2015 | Azizi et al. | |
| 2015/0139205 A1 | 5/2015 | Kenney et al. | |
| 2015/0139206 A1 | 5/2015 | Azizi et al. | |
| 2015/0207599 A1 | 7/2015 | Kim et al. | |

(56) References Cited

U.S. PATENT DOCUMENTS

| | | |
|---|---|---|
| 2015/0208394 A1 | 7/2015 | Seo et al. |
| 2015/0288489 A1 | 10/2015 | Azizi et al. |
| 2015/0327121 A1 | 11/2015 | Li et al. |
| 2016/0020885 A1 | 1/2016 | Li et al. |
| 2016/0211961 A1 | 7/2016 | Azizi et al. |
| 2016/0242173 A1 | 8/2016 | Li et al. |
| 2017/0019916 A1 | 1/2017 | Azizi et al. |
| 2017/0111154 A1 | 4/2017 | Azizi et al. |
| 2017/0135035 A1 | 5/2017 | Azizi et al. |

FOREIGN PATENT DOCUMENTS

| | | |
|---|---|---|
| CN | 105637968 A | 6/2016 |
| CN | 105659656 A | 6/2016 |
| CN | 105659681 A | 6/2016 |
| CN | 105900511 A | 8/2016 |
| CN | 105917730 A | 8/2016 |
| CN | 106100807 A | 11/2016 |
| CN | 106105080 A | 11/2016 |
| CN | 106464652 A | 2/2017 |
| CN | 106899385 A | 6/2017 |
| EP | 2362580 A2 | 8/2011 |
| EP | 3072254 A1 | 9/2016 |
| EP | 3072324 A1 | 9/2016 |
| EP | 3072344 A1 | 9/2016 |
| EP | 3072345 A1 | 9/2016 |
| EP | 3072347 A1 | 9/2016 |
| JP | 2007074689 A | 3/2007 |
| KR | 1020110044938 A | 5/2011 |
| KR | 1020120127676 A | 11/2012 |
| TW | 201044815 A | 12/2010 |
| TW | 201141288 A | 11/2011 |
| TW | 201234880 A | 8/2012 |
| TW | 201251382 A | 12/2012 |
| TW | 201322786 A | 6/2013 |
| TW | 201349815 A | 12/2013 |
| TW | 201406107 A | 2/2014 |
| TW | 201534073 A | 9/2015 |
| TW | 201534074 A | 9/2015 |
| TW | 201538023 A | 10/2015 |
| TW | 201540029 A | 10/2015 |
| TW | 201540118 A | 10/2015 |
| TW | 201541889 A | 11/2015 |
| TW | 201541890 A | 11/2015 |
| TW | 201547248 A | 12/2015 |
| TW | 201547313 A | 12/2015 |
| TW | 201622458 A | 6/2016 |
| TW | 201632022 A | 9/2016 |
| TW | I572173 B | 2/2017 |
| TW | I573413 B | 3/2017 |
| TW | I578838 B | 4/2017 |
| WO | WO-2005053198 A2 | 6/2005 |
| WO | WO-2008118429 A1 | 10/2008 |
| WO | WO-2011025146 A2 | 3/2011 |
| WO | WO-2011068387 A2 | 6/2011 |
| WO | WO-2011153507 A2 | 12/2011 |
| WO | WO-2012057547 A2 | 5/2012 |
| WO | WO-2012106635 A1 | 8/2012 |
| WO | WO-2013055117 A2 | 4/2013 |
| WO | WO-2013058512 A1 | 4/2013 |
| WO | WO-2013077653 A1 | 5/2013 |
| WO | WO-2013089404 A1 | 6/2013 |
| WO | WO-2013191609 A1 | 12/2013 |
| WO | WO-2014066785 A1 | 5/2014 |
| WO | WO-2015076917 A1 | 5/2015 |
| WO | WO-2015076923 A1 | 5/2015 |
| WO | WO-2015076932 A1 | 5/2015 |
| WO | WO-2015077040 A1 | 5/2015 |
| WO | WO-2015077040 A8 | 5/2015 |
| WO | WO-2015077042 A1 | 5/2015 |
| WO | WO-2015077049 A1 | 5/2015 |
| WO | WO-2015077056 A1 | 5/2015 |
| WO | WO-2015077068 A1 | 5/2015 |
| WO | WO-2015077096 A1 | 5/2015 |
| WO | WO-2015077223 A1 | 5/2015 |
| WO | WO-2015127777 A1 | 9/2015 |
| WO | WO-2015130335 A1 | 9/2015 |
| WO | WO-2015130341 A1 | 9/2015 |
| WO | WO-2015171243 A1 | 11/2015 |
| WO | WO-2015195460 A1 | 12/2015 |
| WO | WO-2016010578 A1 | 1/2016 |
| WO | WO-2016010651 A1 | 1/2016 |

OTHER PUBLICATIONS

U.S. Appl. No. 14/447,254, filed Jul. 30, 2014, Master Station and Method for High-Efficiency Wi-Fi (HEW) Communication With a Minimum OFDMA Bandwidth Unit.
U.S. Appl. No. 14/341,055, filed Jul. 25, 2014, HEW Master Station and Method for Communicating in Accordance With a Scheduled OFDMA Technique on Secondary Channels.
U.S. Appl. No. 15/023,262, filed Mar. 18, 2016, Master Station and Method for HEW Communication With Signal Field Configuration for HEW OFDMA MU-MIMO Wideband Channel Operation.
U.S. Appl. No. 14/458,000, filed Aug. 12, 2014, Master Station and Method for HEW Communication Using a Transmission Signaling Structure for a HEW Signal Field.
11ah Preamble for 2Mhz and Beyond, IEEE Submission No. IEEE 802.1-11/1483r2, 1-24, Jan. 2017.
"U.S. Appl. No. 14/341,055, Non Final Office Action dated Nov. 14, 2016", 10 pgs.
"U.S. Appl. No. 14/447,254, Examiner Interview Summary dated Jul. 22, 2016", 4 pgs.
"U.S. Appl. No. 14/447,254, Final Office Action dated Sep. 14, 2016", 13 pgs.
"U.S. Appl. No. 14/447,254, Response filed Aug. 1, 2016 to Non Final Office Action dated Mar. 31, 2016", 12 pgs.
"U.S. Appl. No. 14/458,000, Notice of Allowance dated Aug. 24, 2016", 11 pgs.
"U.S. Appl. No. 14/458,000, Response filed Aug. 8, 2016 to Final Office Action dated May 9, 2016", 12 pgs.
"U.S. Appl. No. 15/052,600, Corrected Notice of Allowance dated Aug. 5, 2016", 7 pgs.
"European Application Serial No. 14864664.9, Response filed Dec. 22, 2016 to Communication pursuant to Rules 161(2) and 162 EPC dated Jun. 28, 2016", 4 pgs.
"European Application Serial No. 16168650.6, Extended European Search Report dated Sep. 7, 2016", 12 pgs.
"Indian Application Serial No. 201647013626, Voluntary Amendment filed Aug. 4, 2016", W/ English Translation, 15 pgs.
"Taiwanese Application Serial No. 104101656, Response filed Sep. 22, 2016 to Office Action dated Mar. 21, 2016", W/ English Claims, 38 pgs.
"Taiwanese Application Serial No. 104106272, Response filed Oct. 14, 2016 to Office Action dated Apr. 18, 2016", W/ English Claims, 45 pgs.
"Taiwanese Application Serial No. 104106275, Response filed Sep. 6, 2016 to Office Action dated Jun. 8, 2016", W/ English Claims, 80 pgs.
"Taiwanese Application Serial No. 104108807, Response filed Nov. 25, 2016 Office Action dated May 26, 2016", W/ English Claims, 65 pgs.
"Taiwanese Application Serial No. 105113980, Office Action dated Jul. 21, 2016", W/ English Claims, 18 pgs.
"Taiwanese Application Serial No. 105113980, Response filed Oct. 24, 2016 to Office Action dated Jul. 21, 2016", W/ English Claims, 80 pgs.
"(Discussion on potential techniques for HEW", IEEE 802.11-13/0871 rO), (Jul. 15, 2013), 13 pgs, Mar. 2016.
"11ah Preamble for 2Mhz and Beyond", IEEE Submission No. IEEE 802.1-11/1483r2, 1-24.
"U.S. Appl. No. 14/304,041, Notice of Allowance dated Oct. 8, 2015", 8 pgs.
"U.S. Appl. No. 14/304,041, Supplemental Notice of Allowability dated Nov. 4, 2015", 5 pgs.
"U.S. Appl. No. 14/315,562, Non Final Office Action dated Sep. 25, 2015", 14 pgs.
"U.S. Appl. No. 14/315,562, Response filed Dec. 28, 2015 to Non

(56) References Cited

OTHER PUBLICATIONS

Final Office Action dated Sep. 25, 2015", 9 pgs.
"U.S. Appl. No. 14/338,137, Corrected Notice of Allowance dated Jan. 22, 2016", 10 pgs.
"U.S. Appl. No. 14/338,137, Notice of Allowance dated Nov. 25, 2015", 14 pgs.
"U.S. Appl. No. 14/458,000, Non Final Office Action dated Dec. 3, 2015", 16 pgs.
"U.S. Appl. No. 14/458,000, Response filed Mar. 3, 2015 to Non Final Office Action dated Dec. 3, 2015", 15 pgs.
"U.S. Appl. No. 14/498,385, Non Final Office Action dated Jan. 14, 2016", 19 pgs.
"U.S. Appl. No. 14/977,405, Non Final Office Action dated Feb. 26, 2016", 7 pgs.
"U.S. Appl. No. 14/977,405, Preliminary Amendment filed Dec. 22, 2015", 11 pgs.
"Guard interval estimation considering switch time and propagation delay", R1-134362, 3GPP TSG RAN WG1 Meeting #74bis, (Oct. 2013).
"International Application Serial No. PCT/CN2014/086532, International Search Report dated Dec. 17, 2014", 4 pgs.
"International Application Serial No. PCT/CN2014/086532, Written Opinion dated Dec. 17, 2014", 4 pgs.
"international Application Serial No. PCT/US2014/044881, International Search Report dated Nov. 24, 2014", 3 pgs.
"International Application Serial No. PCT/US2014/044881, Written Opinion dated Nov. 24, 2014", 7 pgs.
"International Application Serial No. PCT/US2014/053451, International Search Report dated Dec. 10, 2014", 3 pgs.
"International Application Serial No. PCT/US2014/053451, Written Opinion dated Dec. 10, 2014", 4 pgs.
"International Application Serial No. PCT/US2014/055996, International Search Report dated Dec. 17, 2014", 3 pgs.
"International Application Serial No. PCT/US2014/055996, Written Opinion dated Dec. 17, 2014", 5 pgs.
"International Application Serial No. PCT/US2014/056819, International Search Report dated Dec. 31, 2014", 3 pgs.
"International Application Serial No. PCT/US2014/056819, Written Opinion dated Dec. 31, 2014", 6 Pgs.
"International Application Serial No. PCT/US2014/057751, International Search Report dated Jan. 5, 2015", 3 pgs.
"International Application Serial No. PCT/US2014/057751, Written Opinion dated Jan. 5, 2015", 5 pgs.
"International Application Serial No. PCT/US2014/064340, International Search Report dated Feb. 16, 2015", 3 pgs.
"International Application Serial No. PCT/US2014/064340, Written Opinion dated Feb. 16, 2015", 6 pgs.
"International Application Serial No. PCT/US2014/064350, International Search Report dated Feb. 6, 2015", 4 pgs.
"International Application Serial No. PCT/US2014/064350, Written Opinion dated Feb. 6, 2015", 5 pgs.
"International Application Serial No. PCT/US2014/064509, International Search Report dated Feb. 11, 2015", 3 pgs.
"International Application Serial No. PCT/US2014/064509, Written Opinion dated Feb. 11, 2015", 8 pgs.
"International Application Serial No. PCT/US2014/064599, International Search Report dated Feb. 26, 2015", 3 pgs.
"International Application Serial No. PCT/US2014/064599, Written Opinion dated Feb. 26, 2015", 7 pgs.
"International Application Serial No. PCT/US2014/064767, International Search Report dated Feb. 26, 2015", 8 pgs.
"International Application Serial No. PCT/US2014/064767, Written Opinion dated Feb. 26, 2015", 8 pgs.
"International Application Serial No. PCT/US2014/065166, International Search Report dated Jan. 22, 2015", 3 pgs.
"International Application Serial No. PCT/US2014/065166, Written Opinion dated Jan. 22, 2015", 6 pgs.
"International Application Serial No. PCT/US2014/066133, International Search Report dated Feb. 24, 2015", 3 pgs.
"International Application Serial No. PCT/US2014/066133, Written Opinion dated Feb. 24, 2015", 7 pgs.
"International Application Serial No. PCT/US2014/071942, International Search Report dated Apr. 17, 2015", 3 pgs.
"International Application Serial No. PCT/US2014/071942, Written Opinion dated Apr. 17, 2015", 7 pgs.
"International Application Serial No. PCT/US2015/024889, International Search Report dated Jun. 29, 2015", 3 pgs.
"International Application Serial No. PCT/US2015/024889, Written Opinion dated Jun. 29, 2015", 11pgs.
"International Application Serial No. PCT/US2015/035114, International Search Report dated Oct. 19, 2015", 3 pgs.
"International Application Serial No. PCT/US2015/035114, Written Opinion dated Oct. 19, 2015", 8 pgs.
"International Application Serial No. PCT/US2015/035313, International Search Report dated Sep. 25, 2015", 4 pgs.
"International Application Serial No. PCT/US2015/035313, Written Opinion dated Sep. 25, 2015", 8 pgs.
"VHDL Implementation of Reconfigurable Multimode Block Interleaver for OFDM Based WLAN", IJARECE, vol. 1, [Online]. Retrieved from the Internet: <http://ijarece.org/>, (Oct. 2012), 82-84 pgs.
Choi, Jinsoo, "Discussion on OFDMA in HEW", In: IEEE P802.11—High Efficiency WLAN Study Group, (Nov. 11, 2013), 11 pgs.
Chun, Jinyoung, et al., "Legacy Support on HEW frame structure", IEEE 11-13/1057r0, (Sep. 16, 2013), 8 pgs.
Chun, Jinyoung, et al., "Uplink multi-user transmission", In: IEEE P802.11—High Efficiency WLAN Study Group, (Nov. 11, 2013), 18 pgs.
Hertz, Guido R, et al., "Proposed direction and priorities for HEW", In: IEEE P802.11—High Efficiency WLAN Study Group, (Nov. 12, 2013), 17 pgs.
Katsuo, Yunoki, et al., "Access Control Enhancement", doc.:IEEE II-13/1073r1, [Online]. Retrieved from the Internet: <https://mentor.ieee.org/802.11/docurnents?is_dcn=1073>, (Sep. 18, 2013), 1-9.
Koskela, Timo, et al., "Discussion on Potential Techniques for HEW", In: IEEE P802.11—High Efficiency WLAN Study Group, (Jul. 15, 2013), 13 pgs.
Oh, Jinhyung, et al., "Distributed implicit interference alignment in 802.11ac WLAN network", International Conference on ICT Convergence (ICTC), (Oct. 2013), 421-426.
"U.S. Appl. No. 14/447,254, Non Final Office Action dated Mar. 31, 2016", 13 pgs.
"U.S. Appl. No. 14/458,000, Final Office Action dated May 9, 2016", 11 pgs.
"U.S. Appl. No. 15/052,600, Corrected Notice of Allowance dated Jun. 24, 2016", 7 pgs.
"U.S. Appl. No. 15/052,600, Notice of Allowance dated May 20, 2016", 10 pgs.
"U.S. Appl. No. 15/052,600, Preliminary Amendment filed Apr. 1, 2016", 10 pgs.
"International Application Serial No. PCT/US2014/055996, International Preliminary Report on Patentability dated Jun. 2, 2016", 7 pgs.
"International Application Serial No. PCT/US2014/064340, International Preliminary Report on Patentability dated Jun. 2, 2016", 8 pgs.
"international Application Serial No. PCT/US2014/064350, International Preliminary Report on Patentability dated Jun. 2, 2016", 7 pgs.
"International Application Serial No. PCT/US2014/064509, International Preliminary Report on Patentability dated Jun. 2, 2016", 10 pgs.
"International Application Serial No. PCT/US2014/065166, International Preliminary Report on Patentability dated Jun. 2, 2016", 8 pgs.
"International Application Serial No. PCT/US2014/066133, International Preliminary Report on Patentability dated Jun. 2, 2016", 9 pgs.
"Taiwanese Application Serial No. 104101656, Office Action dated Mar. 21, 2016", 7 pgs.

(56) References Cited

OTHER PUBLICATIONS

"Taiwanese Application Serial No. 104106272, Office Action dated Apr. 18, 2016", w/ English Claims, 15 pgs.
"Taiwanese Application Serial No. 104106275, Office Action dated Jun. 8, 2016", 3 pgs.
"Taiwanese Application Serial No. 104108803, Office Action dated Jul. 1, 2016", 4 pgs.
"Taiwanese Application Serial No. 104108807, Office Action dated May 26, 2016", W/ English Search Report, 10 pgs.
"U.S. Appl. No. 14/341,055, Notice of Allowance dated Jul. 25, 2017", 10 pgs.
"U.S. Appl. No. 15/280,782, Examiner Interview Summary dated Jul. 26, 2017", 3 pgs.
"U.S. Appl. No. 15/280,782, Notice of Allowance dated Sep. 8, 2017", 9 pgs.
"U.S. Appl. No. 15/280,782, Response filed Aug. 11, 2017 to Non Final Office Action dated May 12, 2017", 12 pgs.
"U.S. Appl. No. 15/394,069, Examiner Interview Summary dated Jul. 28, 2017", 3 pgs.
"U.S. Appl. No. 15/394,069, Response filed Aug. 23, 2017 to Non Final Office Action dated May 26, 2017", 12 pgs.
"European Application No. 14864664.9, Extended European Search Report dated Aug. 14, 2017", 6 pgs.
"European Application Serial No. 14864107.9, Extended European Search Report dated Jul. 27, 2017", 13 pgs.
"European Application Serial No. 16168650.6, Communication Pursuant to Article 94(3) EPC dated Aug. 2, 2017", 5 pgs.
Dave, Hedberg, et al., "Adjacent Channel Interference and Filtering for 56-carrier Signals;11-04-1579-01-000n-11-04-1579-00-000n-aci-results", (Jan. 17, 2005), 1-26 pgs.
Jinyoung, Chun, et al., "Legacy Support on HEW frame structure", IEEE DRAFT; 11-13-1057-00-0HEW-Legacy-Support-on-HEW-Frame-Structure, IEEE-SA Mentor, Piscataway NJ USA, vol. 802. 11 HEW, (Sep. 16, 2013), 1-8.
Sean, Coffey, et al., "WWiSE complete proposal :presentation ; 11-04-0935-04-000n-wwise-complete-proposal presentation", 66 pgs, Nov. 2004.
"U.S. Appl. No. 14/341,055, Examiner Interview Summary dated Apr. 18, 2017", 3 pgs.
"U.S. Appl. No. 14/341,055, Response filed Apr. 14, 2017 to Non Final Office Action dated Nov. 14, 2016", 11 pgs.
"U.S. Appl. No. 14/447,254, Advisory Action dated Feb. 13, 2017", 4 pgs.
"U.S. Appl. No. 14/447,254, Examiner Interview Summary dated Jan. 18, 2017", 3 pgs.
"U.S. Appl. No. 14/447,254, Response filed Jan. 17, 2017 Final Office Action dated Sep. 14, 2016", 11 pgs.
"U.S. Appl. No. 15/023,262, Non Final Office Action dated Jul. 11, 2017", 14 pgs.
"U.S. Appl. No. 15/263,864, Non Final Office Action dated Mar. 10, 2017", 4 pgs.
"U.S. Appl. No. 15/263,864, Response filed Jun. 9, 2017 to Non Final Office Action dated Mar. 10, 2017", 9 pgs.
"U.S. Appl. No. 15/280,782, Non Final Office Action dated May 12, 2017", 25 pgs.
"U.S. Appl. No. 15/394,069, Non Final Office Action dated May 26, 2017", 18 pgs.
"European Application Serial No. 14863133.6, Extended European Search Report dated Jul. 3, 2017", 10 pgs.
"European Application Serial No. 14863142.7, Extended European Search Report dated May 3, 2017", 7 pgs.
"European Application Serial No. 14864636.7, Extended European Search Report dated Jul. 21, 2017", 8 pgs.
"European Application Serial No. 17153414.2, Extended European Search Report dated May 3, 2017", 8 pgs.
"Indian Application Serial No. 201647013652, Preliminary Amendment dated Aug. 4, 2016", 11 pgs.
"Taiwanese Application Serial No. 104101656, Office Action dated Mar. 7, 2017", With English Claims, 13 pgs.
"Taiwanese Application Serial No. 104108803, Response filed Jan. 3, 2017 to Office Action dated Jul. 1, 2016", w/English Claims, 8 pgs.
"Taiwanese Application Serial No. 104118345, Office Action dated May 10, 2017", W/ English Translation, 9 pgs.
Jinsoo, Choi, "Discussion on OFDMA in HEW ; 11-13-1382-00-0hew-di scussion-on-ofdma-inhew", (LG Electronics): IEEE Draft; 11-13-1382-00-0HEW-DISCUSSI0N-0N-0FDMA-IN-HEW, IEEE-SA Mentor, Piscataway, NJ USA vol. 802.11 HEW, (Nov. 12, 2013), 1-11.
"U.S. Appl. No. 15/023,262, Examiner Interview Summary dated Oct. 11, 2017", 3 pgs.
"U.S. Appl. No. 15/023,262, filed Oct. 10, 2017 to Non Final Office Action dated Jul. 11, 2017", 11 pgs.
"U.S. Appl. No. 15/263,864, Final Office Action dated Sep. 21, 2017", 19 pgs.
"U.S. Appl. No. 15/263,864, Notice of Allowance dated Nov. 9, 2017", 7 pgs.
"U.S. Appl. No. 15/263,864, filed Oct. 18, 2017 to Final Office Action dated Sep. 21, 2017", 11 pgs.
"U.S. Appl. No. 15/280,782, Corrected Notice of Allowance dated Sep. 27, 2017", 2 pgs.
"U.S. Appl. No. 15/280,782, Corrected Notice of Allowance dated Nov. 3, 2017", 2 pgs.
"U.S. Appl. No. 15/394,069, Corrected Notice of Allowance dated Nov. 9, 2017", 2 pgs.
"U.S. Appl. No. 15/394,069, Notice of Allowance dated Sep. 22, 2017", 8 pgs.
"IEEE Standard 802.11b-1999", (1999), 1-89.
"Part 11: Wireless LAN Medium Access Control (MAC) and Physical Layer (PHY) Specifications Part 1 of 2", IEEE Computer Society IEEE Std 802.11-2016 (Revision of IEEE Std 802.11-2012), (2016), 2000 "Part 11: Wireless LAN Medium Access Control (MAC) and Physical Layer (PHY) Specifications Part 2 of 2", IEEE Computer Society IEEE Std 802.11-2016 (Revision of IEEE Std 802.11-2012), (2016), 1535.
"Chinese Application Serial No. 201710063899.5, Voluntary Amendment Filed on Oct. 20, 2017", (W/ English Claims), 23 pgs.
"European Application Serial No. 14863142.7, Response Filed Nov. 15, 2017 to Extended European Search Report dated May 3, 2017", 13 pgs.
"European Application Serial No. 16168650.6, Response Filed Nov. 13, 2017 to Communication Pursuant to Article 94(3) EPC dated Aug. 2, 2017", 10 pgs.
"Taiwanese Application Serial No. 104101656, Response Filed Sep. 6, 2017 to Office Action dated Mar. 7, 2017", (W/ English Claims), 56 pgs.

* cited by examiner

| SCHEDULE TYPE | ALLOCATION |
|---|---|
| SCHEDULE 1 (1 STA) | 1 20MHz STA |
| SCHEDULE 2 (2 STA) | 2 10 MHz STAs |
| SCHEDULE 3 (3 STA) | 2 * 5MHz STAs and 1 10MHz STA |
| SCHEDULE 4 (4 STA) | 4 5MHz STAs |

FIG. 3

| TYPE | VARIABLE STA AID LIST |
|---|---|

FIG. 4

| 4 | STA1 AID | STA2 AID | STA3 AID | STA4 AID |
|---|---|---|---|---|

FIG. 5

| 1 | STA5 AID |
|---|---|

| 1202 SCHEDULE TYPE | 1204 ALLOCATION |
|---|---|
| SCHEDULE 1 (1 STA) | 1 20MHz STA |
| SCHEDULE 2 (2 STA) | 2 10 MHz STAs |

| SCHEDULE TYPE | ALLOCATION | Spatial Streams |
|---|---|---|
| SCHEDULE A | 1 20MHz STA | 1 or more |
| SCHEDULE B | 2 10 MHz STAs | 1 or more |
| SCHEDULE C (3 STA) | 2 * 5MHz STAs and 1 10MHz STA | 1 |
| SCHEDULE D (4 STA) | 4 5MHz STAs | 1 |

| TYPE | FIXED LENGTH STA AID LIST |
|---|---|

METHOD, APPARATUS, AND COMPUTER READABLE MEDIUM FOR MULTI-USER SCHEDULING IN WIRELESS LOCAL-AREA NETWORKS

PRIORITY CLAIM

This application is a U.S. National Stage Application under 35 U.S.C. 371 from International Application No. PCT/US2014/057751, filed Nov. 18, 2014, which claims the benefit of priority to the following U.S. Provisional Patent Applications:

Ser. No. 61/906,059, filed Nov. 19, 2013,
Ser. No. 61/973,376, filed Apr. 1, 2014,
Ser. No. 61/976,951, filed Apr. 8, 2014,
Ser. No. 61/986,256, filed Apr. 30, 2014,
Ser. No. 61/986,250, filed Apr. 30, 2014,
Ser. No. 61/991,730, filed May 12, 2014, and
Ser. No. 62/024,801, filed Jul. 15, 2014,
each of which is incorporated herein by reference in its entirety.

TECHNICAL FIELD

Some embodiments relate to low overhead schedules for high-efficiency wireless communications including high-efficiency wireless local-area network (HEW) devices, and some embodiments relate to low overhead schedules in 802.11ax.

BACKGROUND

One issue with wireless local-area networks (WLANs) is throughput and delay time. The resources of the wireless medium are limited, and users of the wireless medium continue to demand better performance from the WLAN. Thus one technical problem with WLANs is improving the throughput and/or the delay time of the WLAN.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
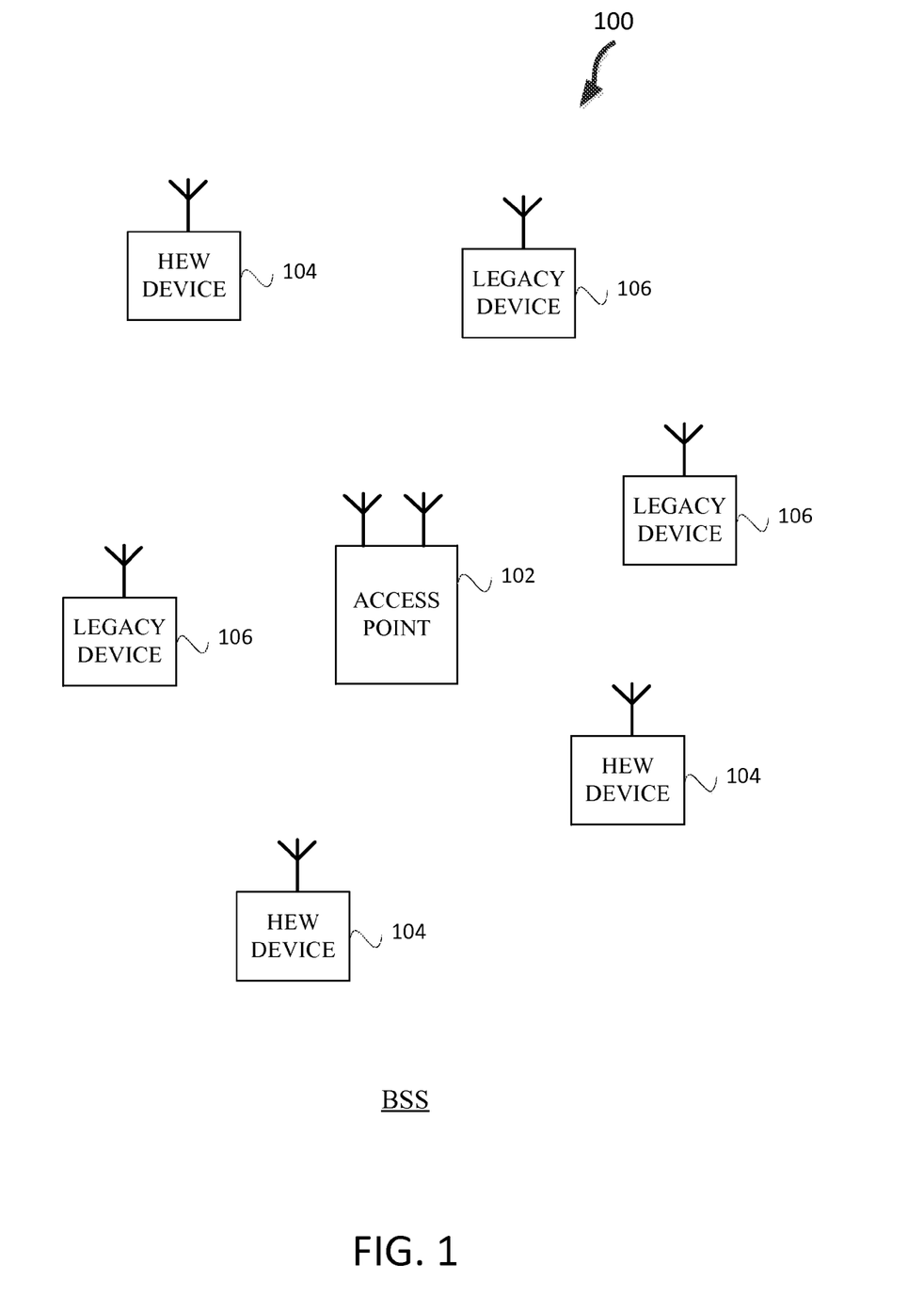
FIG. 1 illustrates a wireless network, in accordance with some embodiments.

FIG. 1 illustrates a wireless network, in accordance with some embodiments. The wireless network may comprise a basic service set (BSS) 100 that may include an access point (AP) 102, a plurality of HEW devices 104, and a plurality of legacy devices 106.

The AP 102 may be an access point (AP) using the Institute of Electrical and Electronics Engineers (IEEE) 802.11 to transmit and receive. The AP 102 may be a base station. The AP 102 may use other communications protocols as well as the 802.11 protocol as described below. The 802.11 protocol may be 802.11ax. The 802.11 protocol may include using OFDMA. The 802.11 may include using multi-user (MU) multiple-input and multiple-output (MIMO)(MU-MIMO), space division multiplexing (SDM), and/or space division multiple access (SDMA). The HEW devices 104 may operate in accordance with 802.11ax and/or DensiFi. The legacy devices 106 may operate in accordance in accordance with one or more of 802.11 a/g/ag/n/ac, or another legacy wireless communication standard.

The HEW devices 104 may be wireless transmit and receive devices such as cellular telephones, handheld wireless devices, wireless glasses, wireless watches, wireless personal devices, tablets, or other devices that may be transmitting and receiving using the 802.11 protocol such as 802.11 ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth, and the bandwidth may be one of 20 MHz, 40 MHz, 80 MHz, or 160 MHz contiguous bandwidths or an 80+80 MHz (160 MHz) non-contiguous bandwidth. In some embodiments, a 320 MHz contiguous bandwidth may be used. In some embodiments, bandwidths of 1 MHz, 1.25 MHz, 2.5 MHz, 5 MHz and 10 MHz or a combination thereof may also be used. In these embodiments, an HEW frame may be configured for transmitting a number of spatial streams.

In other embodiments, the AP 102, HEW device 104, and/or legacy device 106 may implement additional or different technologies such as code division multiple-access (CDMA)2000, CDMA2000 1X, CDMA2000 EV-DO, Interim Standard 2000 (IS-2000), Interim Standard 95 (IS-95), Interim Standard 856 (IS-856), Global System for Mobile communications (GSM), Long-Term Evolution (LTE), a standard from the 3 Generation Partnership Project (3GPP), Enhanced Data rates for GSM Evolution (EDGE), GSM EDGE (GERAN), IEEE 802.16 (i.e., Worldwide Interoperability for Microwave Access (WiMAX)), WiFi®, BlueTooth®, BlueTooth® Low Energy (BLE), 802.15.4, neighbor aware networking (NAN) program, Near-field communication (NFC), and/or a wireless personal area network (WPAN) wireless technology.

In an OFDMA system such as 802.11ax, an associated HEW device 104 may operate on any 20 MHz sub-channel of the BSS 100 (that can operate, for example, at 80 MHz). In example embodiments, an AP 102, HEW devices 104, and legacy devices 106 use carrier sense multiple access/collision avoidance (CSMA/CA). In some embodiments, the media access control (MAC) layer 1606 (see FIG. 16) controls access to the wireless media.

Figure 16:
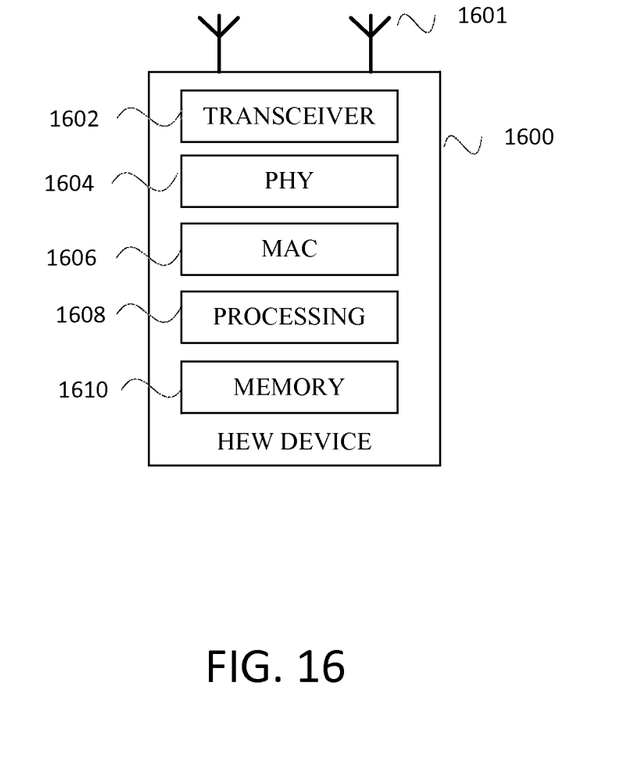
FIG. 16 illustrates a HEW device, in accordance with some embodiments.

In example embodiments, an AP 102, HEW devices 104, and legacy devices 106 perform carrier sensing and can detect whether or not the channel is free. For example, an AP 102, HEW device 104, or legacy device 106 may use clear channel assessment (CCA), which may include a determination as to whether the channel is clear based on a Decibel-milliwatts (dBm) level of reception. In example embodiments, the physical layer (PHY) 1604 is configured to determine a CCA for an AP 102, HEW devices 104, and legacy devices 106.

After determining that the channel is free, an AP 102, HEW device 104, and legacy devices 106 defer their attempt to access the channel during a back-off period to avoid collisions. In example embodiments, an AP 102, HEW device 104, and legacy devices 106 determine the back-off period by first waiting a specific period of time and then adding a random back-off time, which, in some embodiments, is chosen uniformly between 0 and a current contention window (CS) size. A period of time may also be called a duration.

In example embodiments, an AP 102, HEW devices 104, legacy devices 106, access the channel in different ways. For example, in accordance with some IEEE 802.11ax embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 102 in accordance with a non-contention based multiple access technique. This is unlike conventional Wi-Fi communications in which legacy devices 106 and, optionally, HEW devices 104 communicate in accordance with a contention-based communication technique, rather than a non-contention multiple access technique. During the HEW control period, the AP 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a SDMA technique or uplink MU-MIMO (UL MU-MMIO).

The AP 102 may also communicate with legacy devices 106 in accordance with legacy IEEE 802.11 communication techniques. In some embodiments, the master station, which may be the AP 102, may also be configured to communicate with HEW stations outside the HEW control period in accordance with legacy IEEE 802.11 communication techniques, although this is not a requirement.

In example embodiments, the AP 102 is configured to perform one or more of the functions and/or methods described herein such as determining whether or not to adapt the channel contention settings, select new a CCA value and at least one additional new setting, transmit an indication to change a CCA threshold, and transmit a new CCA value and at least one additional new setting to a HEW device 104. In example embodiments, the HEW devices 104 are configured to perform one or more of the functions and/or methods described herein, such as generating and transmitting a low over-head schedule and receiving and operating according to the schedule.

Figure 2:
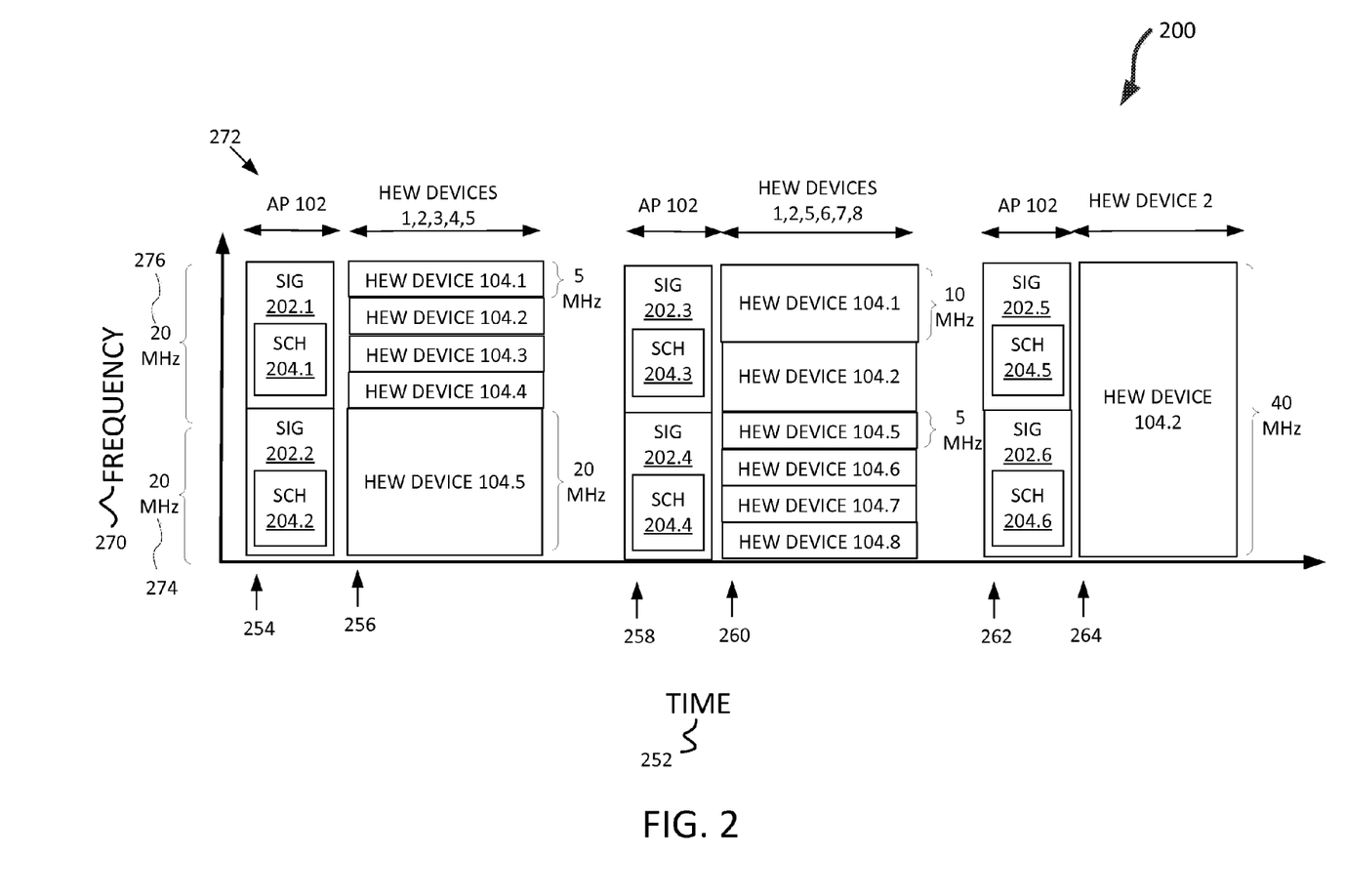
FIG. 2 illustrates a method for multiple-user scheduling in a WLAN operating according to orthogonal frequency division multiple access (OFDMA), according to example embodiments.

FIG. 2 illustrates a method 200 for multiple-user scheduling in a WLAN operating according to OFDMA, according to example embodiments.

Illustrated along the horizontal axis is time 252 and along the vertical axis is frequency 270. Along the top 272 is an indication of which device is transmitting. The frequency 270 may be divided into channels or sub-channels having a bandwidth. As illustrated, there are two channels 274, 276, which may be called sub-channels, and the bandwidth for each of the channels is 20 MHz. In example embodiments, the bandwidth of the channels 274, 276 may be a different bandwidth such as 10 MHz, 40 MHz, 80 MHz, or 160 MHz, and the bandwidth of the channels 274, 276 may not be the same size. In example embodiments, there may be more channels 274, 276. For example, the number of channels 274, 276 may correspond to one or more standards such as an 802.11 standard or 802.11ax. For example, there may be eight channels of 20 MHz each. In example embodiments, no STA can be allocated in more than one 20 MHz channel unless the STA is allocated the entirety of the 20 MHz channels. In example embodiments, there may be multiple spatial streams in accordance with MU-MIMO on one or more the channels 274 276.

The method 200 begins at time 254 with the AP 102 transmitting a signal field (SIG) 202.1 on the channel 276, and SIG 202.2 on channel 274. The SIG 202 may be a SIG that includes information such as modulation and coding information. The SIG 202.1 includes a schedule (SCH) 204.1, and SIG 202.2 includes a SCH 204.2. The SCHs 204 indicate a schedule for how the channels 274, 276 are allocated to the HEW devices 104. In example embodiments, the SCHs 204 are for a HEW control period, and in some embodiments for 802.11ax. The AP 102 determines the schedules 204.

The method 200 continues at time 256 with the HEW devices 104 transmitting in the uplink according to the SCHs 204.1, 204.2. HEW devices 104.1, 104.2, 104.3, and 104.4 interpret the SCH 204.1, and each transmits on a 5 MHz band in channel 276 according to the SCH 204.1. HEW device 104.5 interprets the SCH 204.4, and transmits on the entire 20 MHz on channel 274 according to the SCH 204.2. The transmission period for the HEW devices 104 ends.

The method 200 continues at time 258 with the AP 102 transmitting SIG 202.3 on channel 276 and SIG 202.4 on channel 274. SIG 202.3 includes SCH 204.3, and SIG 202.4 includes SCH 204.4. The SCHs 204 indicate a schedule for how the channels 274, 276, are allocated to the HEW devices 104. In example embodiments, the AP 102 acquires the wireless medium through a contention period before time 258.

The method 200 continues at time 260 with the HEW devices 104 transmitting in the uplink according to the SCHs 204.3, 204.4. HEW devices 104.1, and 104.2 interpret the SCH 204.3, and each transmits on a 10 MHz band in channel 276 according to the SCH 204.3. HEW devices 104.5, 104.6, 104.7, and 104.8 interpret the SCH 204.4, and transmit each on their allocated 5 MHz on channel 274 according to the SCH 204.4. The transmission period for the HEW devices 104 ends.

The method 200 continues at time 262 with the AP 102 transmitting SIG 202.5 on channel 276 and SIG 202.6 on channel 274. SIG 202.5 includes SCH 204.5, and SIG 202.6 includes SCH 204.6. The SCHs 204 indicate a schedule for how the channels 274, 276, are allocated to the HEW devices 104. In example embodiments, the AP 102 acquires the wireless medium through a contention period before time 262.

The method 200 continues at time 264 with the HEW device 104.2 transmitting in the uplink according to the SCHs 204.5, 204.6. HEW device 104.2 interprets the SCH 204.5 and SCH 20.6, and transmits on channel 274 and channel 276, according to the SCH 204.5 and SCH 204.6. The transmission period for the HEW devices 104 ends. The SIGs 202 may be called MAP-SIGs 202 because of the inclusion of the SCHs 204. In example embodiments, the SCHs 204 are included in a different packet than the SIGs 202.

Figure 3:
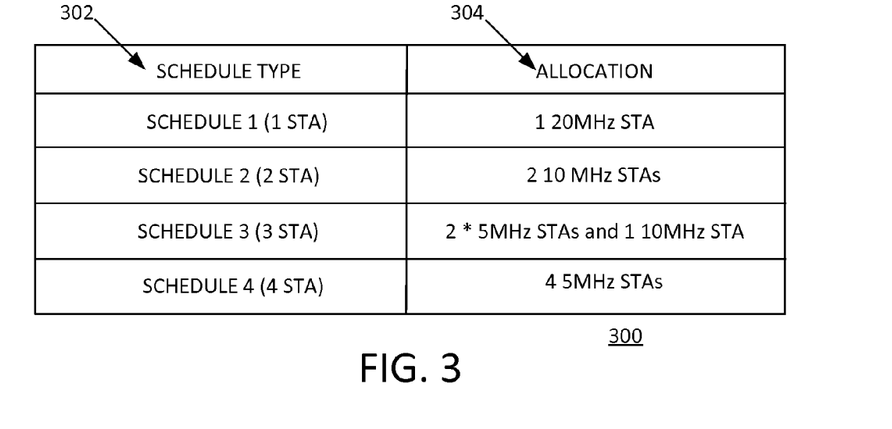
FIG. 3 illustrates a schedule type table for indicating a schedule type in OFDMA, according to example embodiments.

FIG. 3 illustrates a schedule type table 300 for indicating a schedule type in OFDMA, according to example embodiments. Table 300 has two columns: a schedule type 302 and an allocation 304. The schedule type 302 indicates the allocation 304 to the HEW devices 104 for a 20 MHz channel. Schedule 1 indicates that one STA is allocated the entire 20 MHz schedule. Schedule 2 indicates that two STAs are each allocated 10 MHz of the 20 MHz channel. Schedule 3 indicates that 2 STAs are each allocated 5 MHz and one STA is allocated 10 MHz of the 20 MHz channel. Schedule 4 indicates that four STAs each receive 5 MHz of the 20 MHz channel. The schedule type 302 may be represented by two bits in a packet as described herein. The STAs may be represented by an AID that includes an address that uniquely identifies the STA within the BSS 100 (see FIG. 1). The HEW devices 104 may be STAs. In example embodiments, the schedule type may be represented by 2 bits. One skilled in the art will recognize that the schedule types 302 can correspond to different allocations 304. One skilled in the art will recognize that the schedule types 302 may be extended to divide the channel into smaller bandwidths such as 2.5 MHz and 1.25 MHz.

Figure 4:
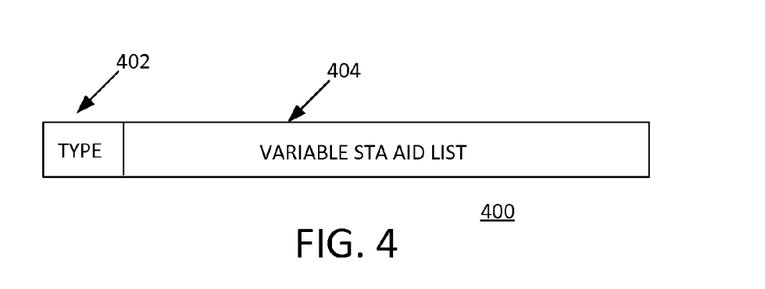
FIG. 4 illustrates a variable-length schedule with a type and variable STA association identification (AID) list.

In example embodiments, the AP 102 and HEW devices 104 may interpret the schedules differently depending on whether there is more than one active spatial stream. In example embodiments, the AP 102 and HEW devices 104 interpret the type differently if there multiple active spatial streams on the channel. In example embodiments, the schedule may be limited to four HEW devices 104 or STAs. In example embodiments, the type 402 includes an indication of whether the allocation is for a single stream or multiple streams.

FIGS. 4-7 illustrate variable-length schedules for a channel in OFDMA, according to example embodiments. Illustrated in FIG. 4 is a variable-length schedule 400 with a type 402 and variable STA AID list 404. The type 402 may be as described in relation to FIG. 3. The variable STA AID list 404 may be a STA AID list where the number of STA AIDs in the list depends on the type 402.

Figure 5:
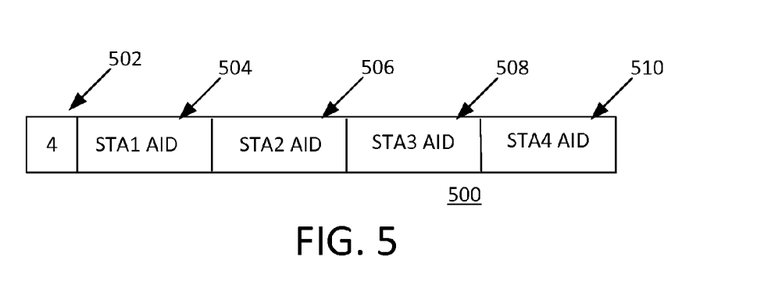
FIG. 5 illustrates a schedule that is an example of the variable-length schedule of FIG. 4.

Illustrated in FIG. 5 is a schedule 500 that is an example of the variable-length schedule 400 (FIG. 4). The type 502 is 4, which indicates four STAs each receiving 5 MHz, according to the schedule type table 300 of FIG. 3. The order of the STA AIDs may indicate which part of the 20 MHz channel the STA is allocated. For example, schedule 500 may be schedule 204.1 of FIG. 2. The STA1 AID 504 may indicate HEW Device 104.1, STA2 AID 506 may indicate HEW device 104.2, STA3 AID 508 may indicate HEW device 104.3, and STA4 AID 510 may indicate HEW device 104.4. Similarly, schedule 500 may be schedule 204.4 with a different correspondence between the STAs and HEW devices 104.

Figure 6:
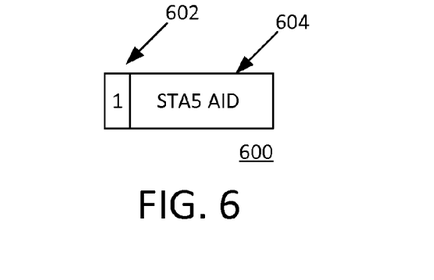
FIG. 6 illustrates a schedule that is an example of the variable-length schedule 400 of FIG. 4.

Illustrated in FIG. 6 is a schedule 600 that is an example of the variable-length schedule 400 (FIG. 4). The type 602 is 1, which indicates one STA receiving the entire 20 MHz channel, according to the schedule type table 300 of FIG. 3. The schedule 600 may be schedule 204.2 where STA5 AID 604 indicates HEW device 104.5. Similarly, schedule 600 may be schedule 204.5 and schedule 204.6 with a STA5 AID 604 corresponding to HEW device 104.2.

Figure 7:
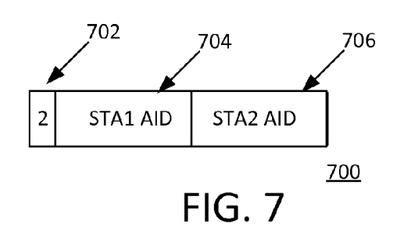
FIG. 7 illustrates a schedule that is an example of the variable-length schedule of FIG. 4.

Illustrated in FIG. 7 is a schedule 700 that is an example of the variable-length schedule 400 (FIG. 4). The type 702 is 7, which indicates two STAs each receiving 10 MHz, according to the schedule type table 300 of FIG. 3. The order of the STA AIDs may indicate which part of the 20 MHz channel the STA is allocated. For example, schedule 700 may be schedule 204.3 of FIG. 2. The STA1 AID 704 may indicate HEW Device 104.1, and STA2 AID 706 may indicate HEW device 104.2.

Figure 8:
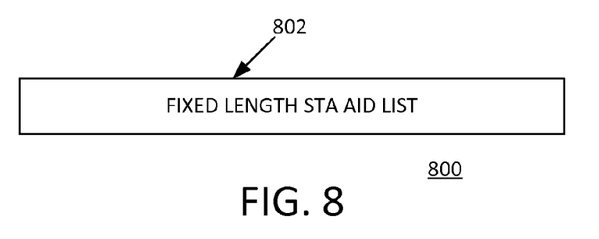
FIG. 8 illustrates a fixed-length schedule where the schedule includes a fixed length STA AID list.

FIGS. 8-11 illustrate fixed-length schedules for a channel in OFDMA, according to example embodiments. Illustrated in FIG. 8 is a fixed-length schedule 800 where the schedule includes a fixed length STA AID list 802. The fixed length STA AID list 802 may indicate a portion of the channel allocated to the corresponding STA.

Figure 9:
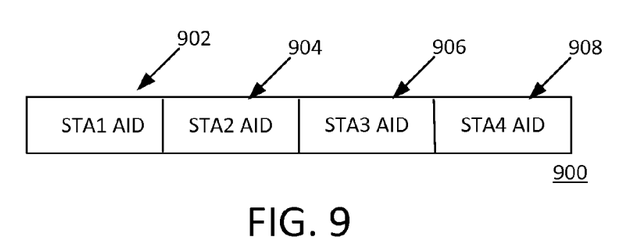
FIG. 9 illustrates a schedule that is an example of a fixed-length schedule, according to example embodiments.

Illustrated in FIG. 9 is a schedule 900 that is an example of a fixed-length schedule, according to example embodiments. The schedule 900 may not have a type field. The allocation of each of four 5 MHz of the channel may be indicated by the position of the AID within the schedule 900.

For example, schedule 900 may be schedule 202.1 (FIG. 2) where STA1 AID 902 indicates HEW device 104.1, STA2 AID 904 indicates HEW device 104.2, STA3 AID 906 indicates HEW device 104.3, and STA4 908 indicates HEW device 104.4. As another example, schedule 900 may be schedule 202.4 where STA1 AID 902 indicates HEW device 104.5, STA2 AID 904 indicates HEW device 104.6, STA3 AID 906 indicates HEW device 104.7, and STA4 908 indicates HEW device 104.8. As one skilled in the art would recognize, the order of the STAs may indicate allocation of different portions of the channel.

Figure 10:
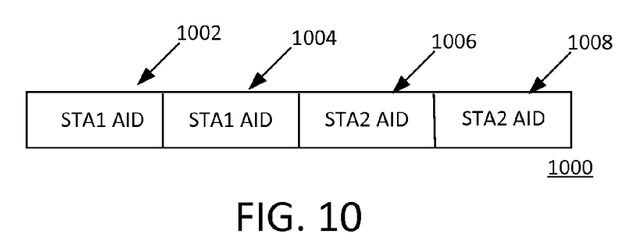
FIG. 10 illustrates a schedule that is an example of a fixed-length schedule, according to example embodiments.

Illustrated in FIG. 10 is a schedule 1000 that is an example of a fixed-length schedule, according to example embodiments. The schedule 1000 may not have a type field. The allocation of each of four 5 MHz of the channel may be indicated by the position of the AID within the schedule 1000. For example, schedule 1000 may be schedule 204.3 (FIG. 2) where STA1 AIDs 1002, 1004 indicate HEW device 104.1 and STA2 AIDs 1006, 1008 indicate HEW device 104.2. As one skilled in the art would recognize the order of the STAs may indicate allocation of different portions of the channel.

Figure 11:
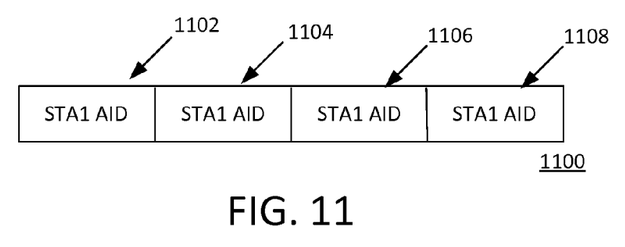
FIG. 11 illustrates a schedule that is an example of a fixed-length schedule, according to example embodiments.

Illustrated in FIG. 11 is a schedule 1100 that is an example of a fixed-length schedule, according to example embodiments. The schedule 1100 may not have a type field. The allocation of each of four 5 MHz of the channel may be indicated by the position of the AID within the schedule 1000. For example, schedule 1100 may be schedule 204.2 (FIG. 2) where STA1 AIDs 1102, 1104, 1106, 1108 indicate HEW device 104.5. Similarly, schedule 1100 may be schedules 204.5, 204.6 where STAT AIDs 1102, 1104, 1106, 1108 indicate HEW device 104.2.

Figure 12:
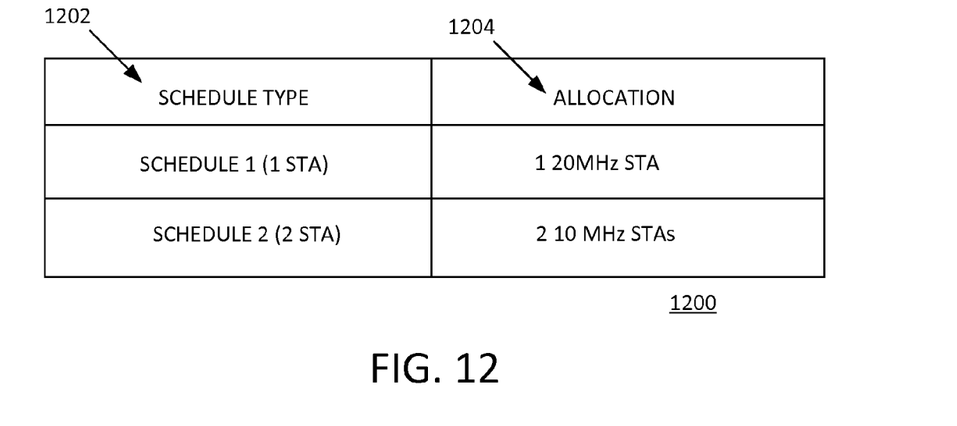
FIG. 12 illustrates a schedule type table for indicating a schedule type in OFDMA, according to another example embodiment.

FIG. 12 illustrates a schedule type table 1200 for indicating a schedule type in OFDMA, according to another example embodiment. Table 1200 has two columns: a schedule type 1202 and an allocation 1204. The schedule type 1202 indicates the allocation 1204 to the HEW devices 104 for a 20 MHz channel. Schedule 1 indicates that one STA is allocated the entire 20 MHz schedule. Schedule 2 indicates that two STAs are each allocated 10 MHz of the 20 MHz schedule. The allocations 1204 in table 1200 are limited to a minimum of 10 MHz. The STAs may be represented by an AID that includes an address that uniquely identifies the STA within the BSS 100 (see FIG. 1). The HEW devices 104 may be STAs. The schedule type 1202 may be represented by one bit. One skilled in the art will recognize that the schedule types 1202 can correspond to different allocations 1204.

Figure 13:
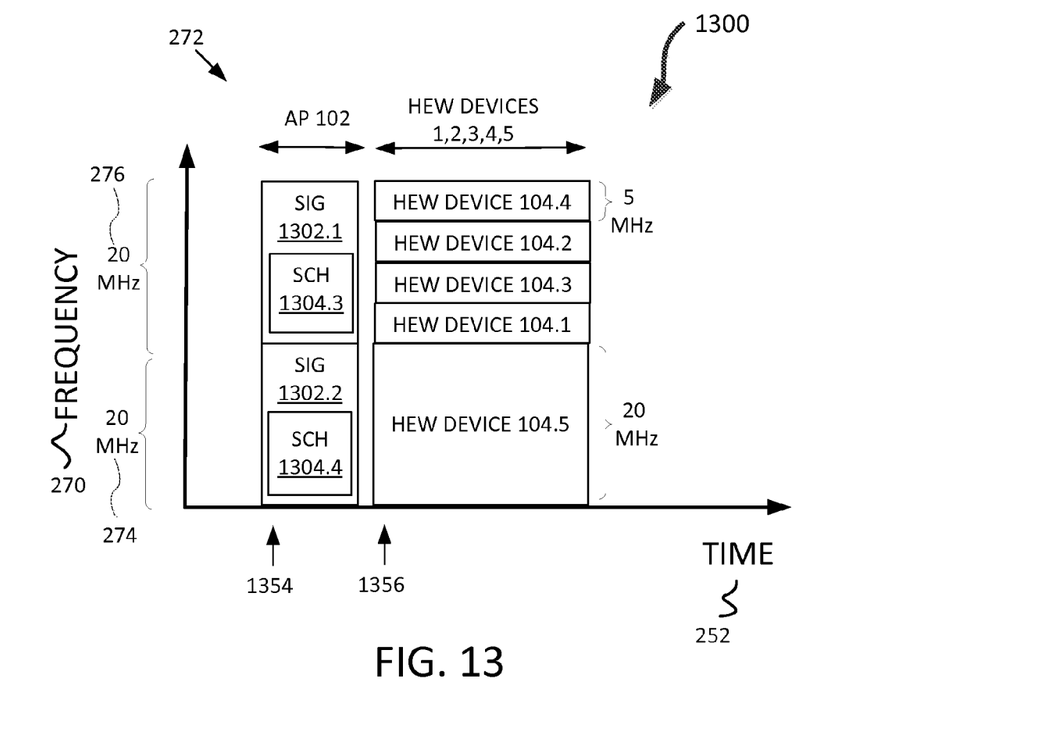
FIG. 13 illustrates a method for multiple-user scheduling in a WLAN operating according to OFDMA.

FIG. 13 illustrates a method 1300 for multiple-user scheduling in a WLAN operating according to OFDMA in which an alternative schedule to schedule 204.1 in FIG. 2 is used.

The method 1300 begins at time 1354 with the AP 102 transmitting a SIG 1302.1 on channel 276, and SIG 1302.2 on channel 274. The SIG 1302.1 includes a SCH 1304.3, and SIG 1302.2 includes a SCH 1304.4. The SCHs 204 indicate a schedule for how the channels 274, 276, are allocated to the HEW devices 104. In example embodiments, the SCHs 1304 are for a HEW control period. The AP 102 may determine the schedules 1304 based on information regarding the operation bandwidth of the HEW devices 104. Moreover, the HEW devices 104 may interpret the SCHs 1304 in terms of their operation bandwidth. For example, HEW device 104.1 may not operate in all the tone of its allocation in channel 276. In example embodiments, the HEW device 104.1 will interpret the allocation as meaning the HEW device 104.1 is allocated the tones within the allocation that are part of its operation bandwidth. Moreover, the AP 102 may determine the schedules 204 based on information regarding the operation bandwidth of the HEW devices 104. For example, the AP 102 may allocate HEW device 104.1 to the lower end of channel 276 (as in FIG. 13) rather than at the upper end of channel 276 (as in FIG. 2) because HEW device 104.1 may have more operating tones at the lower end than at the higher end. Alternatively, the AP 102 may have scheduled the HEW device 104.1 on the lower end so as to permit HEW device 104.4 to be scheduled on the higher end of channel 276, where HEW device 104.4 may have more tones than on the lower end of the channel 276.

The method 1300 continues at time 1356 with the HEW devices 104 transmitting in the uplink according to the SCHs 1304.3, 1304.4. HEW devices 104.1, 104.2, 104.3, and 104.4 interpret the SCH 1304.3, and each transmits on a 5 MHz band in channel 276 according to the SCH 1304.3. HEW device 104.5 interprets the SCH 1304.4, and transmits on the entire 20 MHz on channel 274 according to the SCH 1304.4. In example embodiments, the HEW devices 104 interpret the SCHs 1304.3, 1304.4 based on their operation bandwidth.

In example embodiments, the AP 102 and HEW devices 104 may interpret the schedules differently depending on whether there is more than one active spatial stream. In example embodiments, the AP 102 and HEW devices 104 interpret the type differently if there are multiple active spatial streams on the channel. In example embodiments, the schedule may be limited to four HEW devices 104 or STAs. In example embodiments, the type 402 (FIG. 4) includes an indication of whether the allocation is for a single stream or multiple streams.

Figure 14:
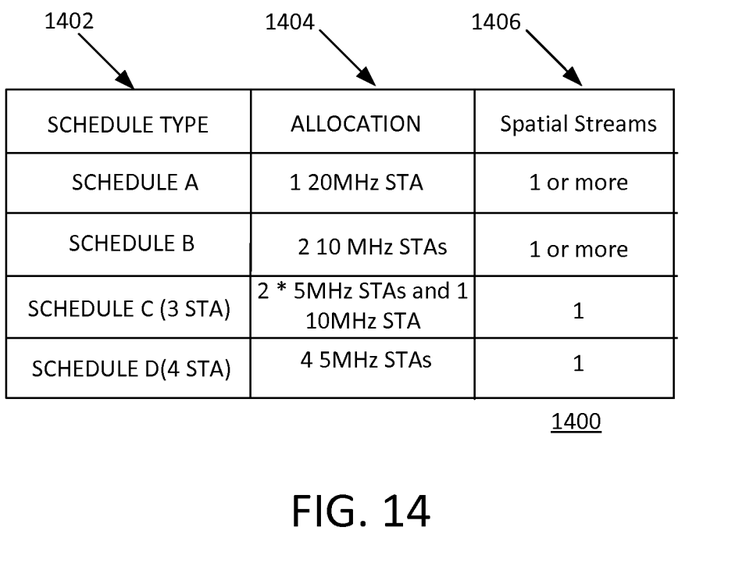
FIG. 14 illustrates a schedule type table for indicating a schedule type in OFDMA, according to example embodiments.

FIG. 14 illustrates a schedule type table 1400 for indicating a schedule type in OFDMA, according to example embodiments. Table 1400 has three columns: a schedule type 1402, an allocation 1404, and a number of spatial streams 1406. The schedule type 1402 indicates the allocation 1404 to the HEW devices 104 for a 20 MHz channel. Schedule A indicates that one STA is allocated the entire 20 MHz schedule per spatial stream 1406. Schedule A may indicate a number of STAs where each STA receives one or more 20 MHz allocation of an entire spatial stream. In example embodiments, the number of STAs may be limited to four in the schedule. Schedule B indicates that two STAs are each allocated 10 MHz of one or more spatial streams of the 20 MHz channel. Schedule B may indicate two pairs of STAs, in which case each pair of STAs is allocated one or more spatial streams of the 20 MHz channel and each pair of STAs are each allocated 10 MHz of the spatial stream. In example embodiments, schedule A and schedule B may be mixed. For example, four STAs may be indicated in the schedule type, and there may be four active spatial streams. Two STAs may each be allocated the entire 20 MHz channel of a spatial stream, and two other STAs may be allocated 10 MHz in each of two spatial streams.

Schedule C indicates that 2 STAs are each allocated 5 MHz and one STA is allocated 10 MHz of the 20 MHz channel. Schedule D indicates that four STAs each receive 5 MHz of the 20 MHz channel. Schedule C and D may only be valid for one spatial stream. The schedule type 1402 may be represented by bits in a packet as described herein. The STAs may be represented by an AID that includes an address that uniquely identifies the STA within the BSS 100 (see FIG. 1). The HEW devices 104 may be STAs. In example embodiments, the schedule type may be represented by 2 bits. One skilled in the art will recognize that the schedule types 1402 can correspond to different allocations 1404. One skilled in the art will recognize that the schedule types 1402 may be extended to divide the channel into smaller bandwidths such as 2.5 MHz and 1.25 MHz, or extended to use one or more schedule types 1402 for different spatial streams. In some embodiments, a packet similar to SCH 400 may be used for indicating the schedule according to table 1400. In some embodiments, a fixed sized packet with a type similar to the SCH 1500 may be used for indicating the schedule according to table 1400.

In example embodiments, the AP 102 and HEW devices 104 may interpret the schedules differently depending on whether there is more than one active spatial stream. In example embodiments, the AP 102 and HEW devices 104 interpret the type differently if there are multiple active spatial streams on the channel. In example embodiments, the schedule may be limited to four HEW devices 104 or STAs. In example embodiments, the type 402 includes an indication of whether the allocation is for a single stream or multiple streams.

Figure 15:
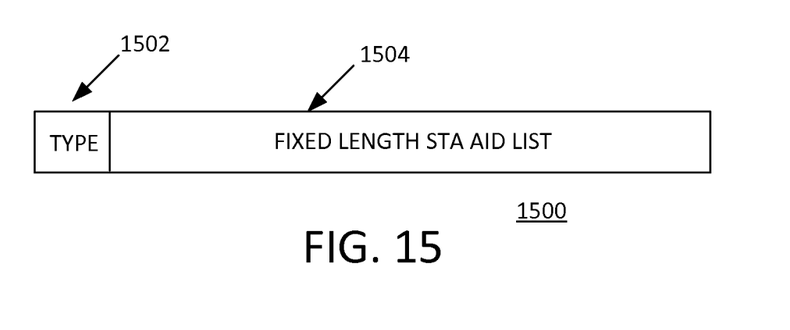
FIG. 15 illustrates a fixed-length schedule with a type and variable STA AID list.

Illustrated in FIG. 15 is a fixed-length schedule 1500 with a type 1502 and fixed length STA AID list 1504. The type 1502 may be as described in relation to FIG. 3, 12, or 14. The STA AID list 1504 may be a STA AID list where the number of STA AIDs in the list is a fixed number of STAs, which may be, for example, four STAs.

FIG. 16 illustrates a HEW device, in accordance with some embodiments. HEW device 1600 may be an HEW compliant device that may be arranged to communicate with one or more other HEW devices, such as HEW devices 104 (FIG. 1), or AP 102 (FIG. 1), as well as communicate with legacy devices 106 (FIG. 1). HEW devices 104 and legacy devices 106 may also be referred to as HEW STAs and legacy STAs, respectively. HEW device 600 may be suitable for operating as AP 102 (FIG. 1) or an HEW device 104 (FIG. 1). In accordance with embodiments, HEW device 1600 may include, among other things, a transmit/receive element (for example an antenna) 1601, a transceiver 1602, PHY 1604 circuitry, and MAC 1606 circuitry. PHY 1604 and MAC 1606 may be HEW compliant layers and may also be compliant with one or more legacy IEEE 802.11 standards. MAC 1606 may be arranged to configure PHY layer convergence procedure (PLCP) protocol data units (PPDUs) and arranged to transmit and receive PPDUs, among other things. HEW device 1600 may also include other hardware processing circuitry 1608, and memory 1610 may be configured to perform the various operations described herein. The processing circuitry 1608 may be coupled to the transceiver 1602, which may be coupled to the transmit/receive element 1601. While FIG. 16 depicts the processing circuitry 1608 and the transceiver 1602 as separate components, the processing circuitry 1608 and the transceiver 1602 may be integrated together in an electronic package or chip.

In example embodiments, the HEW device 104 is configured to perform one or more of the functions and/or methods described herein such as the methods, apparatuses, and functions described in conjunction with FIGS. 2 through 15; and in particular to schedules 400, 500, 600, 700, 800, 900, 1000, 1100, and 1500; and to descriptions of schedule types 300, 1200, and 1400.

The PHY 1604 may be arranged to transmit the HEW PPDU. The PHY 1604 may include circuitry for modulation/demodulation, upconversion/downconversion, filtering, amplification, and the like. In some embodiments, the hardware processing circuitry 1608 may include one or more processors. The hardware processing circuitry 1608 may be configured to perform functions based on instructions being stored in a RAM or ROM, or based on special purpose circuitry. In some embodiments, the hardware processing circuitry 1608 may be configured to perform one or more of the functions described herein for sending and receiving schedules.

In some embodiments, two or more antennas may be coupled to the PHY 1604 and arranged for sending and receiving signals including transmission of the HEW packets. The HEW device 1600 may include a transceiver 1602 to transmit and receive data such as HEW PPDU and packets that include an indication that the HEW device 1600 should adapt the channel contention settings according to settings included in the packet. The memory 1610 may store information for configuring the other circuitry to perform operations for configuring and transmitting BAR and BA packets and performing the various operations described herein including sending and responding to BARs and BAs.

In some embodiments, the HEW device 1600 may be configured to communicate using OFDM communication signals over a multicarrier communication channel. In some embodiments, HEW device 1600 may be configured to communicate in accordance with one or more specific communication standards, such as the IEEE standards including IEEE 802.11-2012, 802.11n-2009, 802.11ac-2013, 802.11ax, standards and/or proposed specifications for WLANs, although the scope of the example embodiments is not limited in this respect as they may also be suitable to transmit and/or receive communications in accordance with other techniques and standards. In some embodiments, the HEW device 1600 may use 4× symbol duration of 802.11n or 802.11ac.

In some embodiments, a HEW device 1600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an AP, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an liquid crystal display (LCD) screen including a touch screen.

The transmit/receive element 1601 may comprise one or more directional or omnidirectional antennas, including, for example, dipole antennas, monopole antennas, patch antennas, loop antennas, microstrip antennas or other types of antennas suitable for transmission of radio-frequency (RF) signals. In some MIMO embodiments, the antennas may be effectively separated to take advantage of spatial diversity and the different channel characteristics that may result.

Although the device 1600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example embodiments have the technical effect of increasing the efficiency of the wireless medium as disclosed in conjunction with FIGS. 1-16. The HEW device 104, thus, may increase both the throughput of the HEW device 104 and the throughput of other HEW devices 104 and/or legacy devices 106, and may decrease the delay time.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media. Some embodiments may include one or more processors and may be configured with instructions stored on a computer-readable storage device.

Example embodiments have the technical effect of improving efficiency by providing a low-overhead schedule for the channels during a multi-user OFDMA up-link period.

Example embodiments have the technical effect of improving efficiency by sending a separate schedule for the channel in each channel rather than sending a combined schedule.

The following examples pertain to further embodiments. Example 1 is a wireless communication device comprising circuitry. The circuitry to: determine a plurality of schedules for each of a plurality of channels for an orthogonal frequency division multiple access (OFDMA) communication in a wireless local-area network (WLAN), wherein each of the plurality of schedules comprise a frequency allocation for one or more communication devices; and transmit the schedule of the one or more schedules on the corresponding channel of the plurality of channels.

In Example 2, the subject matter of Example 1 can optionally include where the circuitry is further to: transmit the corresponding schedule of the one or more schedules on the corresponding channel of the plurality of channels as a portion of a signal field frame.

In Example 3, the subject matter of Examples 1 or 2 can optionally include where a number of user association identifications (AIDs) in a user AID list is based on the schedule type.

In Example 4, the subject matter of any of Examples 1-3 can optionally include where the number of user AIDs is limited to at most four; and wherein a smallest bandwidth allocation is 5 mega-Hertz (MHz).

In Example 5, the subject matter of any of Examples 1-4 can optionally include where the schedule type further indicates the schedule for each of one or more spatial streams associated with the each of the plurality of channels.

In Example 6, the subject matter of any of Examples 1-5 can optionally include where each of the plurality of schedules comprises a fixed number of user association identifications (AIDs), and a bandwidth allocation is indicated by a position of each of the AIDs of the fixed number of AIDs.

In Example 7, the subject matter of Example 6 can optionally include where each of the plurality of schedules is a schedule for each of the plurality of channels and for each of one or more spatial streams associated with the each of the plurality of channels.

In Example 8, the subject matter of any of Examples 1-7 can optionally include wherein the circuitry is further configured to: transmit the corresponding schedule of the one or more schedules on each of the one or more channels in accordance with 802.11ax.

In Example 9, the subject matter of any of Examples 1-8 can optionally include where each of the plurality of schedules comprises a schedule type and a user association identification (AID) list.

In Example 10, the subject matter of any of Examples 1-9 can optionally include where the circuitry is further to: determine the plurality of schedules for each of the plurality of channels based at least on an operation bandwidth of the one or more wireless communication devices.

In Example 11, the subject matter of any of Examples 1-10 can optionally include where the communication is a transmit opportunity (TXOP).

In Example 12, the subject matter of any of Examples 1-11 can optionally include wherein each of the plurality of schedules comprises a fixed number of user association identifications (AIDs) and a type that indicates a bandwidth allocation for each of the one or more wireless communication devices.

In Example 13, the subject matter of any of Examples 1-12 can optionally include memory and a transceiver coupled to the circuitry.

In Example 14, the subject matter of Example 13 can optionally include one or more antennas coupled to the transceiver.

Example 15 is a method for multi-user scheduling performed on a high-efficiency wireless local-area network (HEW) device. The method may include determining a plurality of schedules for each of a plurality of channels for an orthogonal frequency division multiple access (OFDMA) communication in a wireless local-area network (WLAN), wherein each of the plurality of schedules comprise a frequency allocation for one or more communication devices; and transmitting the schedule of the one or more schedules on the corresponding channel of the one or more channels.

In Example 16, the subject matter of Example 15 can optionally include where the transmitting the corresponding schedule further comprises:
transmitting the schedule of the one or more schedules on the corresponding channel of the one or more channels as a portion of a signal field frame.

In Example 17, the subject matter of Examples 15 or 16 can optionally include where each of the plurality of schedules comprises a schedule type and a user association identification (AID) list.

In Example 18, the subject matter of any of Examples 15-17 can optionally include where each of the plurality of schedules comprises a fixed number of user association identifications (AIDs), and a bandwidth allocation is indicated by a position of each of the AIDs of the fixed number of AIDs.

Example 19 is a wireless communication device comprising processing circuitry to: receive a plurality of schedules, one for each of a plurality of channels for an orthogonal frequency division multiple access (OFDMA) communication in a wireless local-area network (WLAN), wherein each of the plurality of schedules comprises a frequency allocation for one of the plurality of channels for a transmit opportunity (TXOP); determine if the frequency allocation of each of the plurality of schedules indicates that the wireless communication device received the frequency allocation; and transmit simultaneously on each of the plurality of channels where the frequency allocation indicates that the wireless communication device received at least a portion of the frequency allocation.

In Example 20, the subject matter of Example 19 can optionally include where each of the plurality of schedules comprises a schedule type and a user association identification (AID) list.

In Example 21, the subject matter of Example 20 can optionally include where a number of user AIDs in the user AID list is based on the schedule type.

In Example 22, the subject matter of Example 21 can optionally include where the schedule type further indicates the schedule for each of one or more spatial streams associated with the each of the plurality of channels.

In Example 23, the subject matter of Examples 19 or 20 can optionally include where each of the plurality of schedules comprises a fixed number of user association identifications (AIDs), and the bandwidth allocation is indicated by a position of each of the AIDs of the fixed number of AIDs.

Example 24 is a non-transitory computer-readable storage medium that stores instructions for execution by one or more processors to perform operations for high-efficiency Wi-Fi (HEW). The instructions to configure the one or more processors to: determine a plurality of schedules for each of a plurality of channels for an orthogonal frequency division multiple access (OFDMA) communication in a wireless local-area network (WLAN), wherein each of the plurality of schedules comprise a frequency allocation for one or more HEW devices; and transmit simultaneously the corresponding schedule of the one or more schedules on each of the one or more channel.

In Example 25, the subject matter of Example 24 can optionally include where each of the plurality of schedules comprises a schedule type and a user association identification (AID) list.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the HE AP comprising: memory; and, processing circuitry coupled to the memory, the processing circuitry to:
   determine a plurality of schedules for each of a plurality of channels for an orthogonal frequency division multiple access (OFDMA) communication in a wireless local-area network (WLAN), wherein each of the plurality of schedules comprise a frequency allocation for one or more HE stations, and an allocation for each of one or more spatial streams associated with the each of the plurality of channels; and
   configure the HE AP to transmit the schedule of the one or more schedules on the corresponding channel of the plurality of channels.

2. The HE AP of claim 1, wherein the processing circuitry is further to:
   transmit the corresponding schedule of the one or more schedules on the corresponding channel of the plurality of channels as a portion of a signal field frame.

3. The HE AP of claim 1, wherein a number of user association identifications (AIDs) in a user AID list is based on a schedule type.

4. The HE AP of claim 1, wherein the number of user AIDs is limited to at most four; and wherein a smallest bandwidth allocation is 5 mega-Hertz (MHz).

5. The HE AP of claim 1, wherein each of the plurality of schedules comprises a fixed number of user association identifications (AIDs), and a bandwidth allocation is indicated by a position of each of the AIDs of the fixed number of AIDs.

6. The HE AP of claim 5, wherein each of the plurality of schedules is a schedule for each of the plurality of channels and for each of one or more spatial streams associated with the each of the plurality of channels.

7. The HE AP of claim 1, wherein the processing circuitry is further configured to:
   transmit the corresponding schedule of the one or more schedules on each of the one or more channels in accordance with 802.11ax.

8. The HE AP of claim 1, wherein each of the plurality of schedules comprises a schedule type and a user association identification (AID) list.

9. The HE AP of claim 1, wherein the circuitry is further to:
   determine the plurality of schedules for each of the plurality of channels based at least on an operation bandwidth of the one or more wireless communication devices.

10. The HE AP of claim 1, wherein the communication is a transmit opportunity (TXOP).

11. The HE AP of claim 1, wherein each of the plurality of schedules comprises a fixed number of user association identifications (AIDs) and a type that indicates a bandwidth allocation for each of the one or more HE stations.

12. The HE AP of claim 1, the HE AP further comprising: transceiver circuitry coupled to the memory.

13. The HE AP of claim 12, further comprising one or more antennas coupled to the transceiver circuitry.

14. A method for multi-user scheduling performed on a high-efficiency (HE) access point (AP), the method comprising:
    determining a plurality of schedules for each of a plurality of channels for an orthogonal frequency division multiple access (OFDMA) communication in a wireless local-area network (WLAN), wherein each of the plurality of schedules comprise a frequency allocation for one or more HE stations, and an allocation for each of one or more spatial streams associated with the each of the plurality of channels; and
    configuring the HE AP to transmit the schedule of the one or more schedules on the corresponding channel of the plurality of channels.

15. The method of claim 14, wherein the transmitting the corresponding schedule further comprises:
    transmitting the schedule of the one or more schedules on the corresponding channel of the one or more channels as a portion of a signal field frame.

16. The method of claim 14, wherein each of the plurality of schedules comprises a schedule type and a user association identification (AID) list.

17. The method of claim 14, wherein each of the plurality of schedules comprises a fixed number of user association identifications (AIDs), and a bandwidth allocation is indicated by a position of each of the AIDs of the fixed number of AIDs.

18. An apparatus of a high-efficiency (HE) station, the HE station comprising: memory; and, processing circuitry coupled to the memory, the processing circuitry configured to:

decode a plurality of schedules, one for each of a plurality of channels for an orthogonal frequency division multiple access (OFDMA) communication in a wireless local-area network (WLAN), wherein each of the plurality of schedules comprises a frequency allocation for one of the plurality of channels for a transmit opportunity (TXOP) and an allocation for each of one or more spatial streams associated with the each of the plurality of channels;

determine if the frequency allocation of each of the plurality of schedules indicates that the wireless communication device received the frequency allocation; and configure the HE station to transmit simultaneously on each of the plurality of channels where the frequency allocation indicates that the wireless communication device received at least a portion of the frequency allocation.

19. The HE station of claim 18, wherein each of the plurality of schedules comprises a schedule type and a user association identification (AID) list.

20. The HE station of claim 19, wherein a number of user AIDs in the user AID list is based on the schedule type.

21. The HE station of claim 20, wherein the schedule type further indicates the schedule for each of one or more spatial streams associated with the each of the plurality of channels.

22. The HE station of claim 18, wherein each of the plurality of schedules comprises a fixed number of user association identifications (AIDs), and the bandwidth allocation is indicated by a position of each of the AIDs of the fixed number of AIDs.

23. A non-transitory computer-readable storage medium that stores instructions for execution by one or more processors, the instructions to configure the one or more processors to cause an apparatus of a high-efficiency (HE) access point (AP) to:

determine a plurality of schedules for each of a plurality of channels for an orthogonal frequency division multiple access (OFDMA) communication in a wireless local-area network (WLAN), wherein each of the plurality of schedules comprise a frequency allocation for one or more HE stations, and an allocation for each of one or more spatial streams associated with the each of the plurality of channels; and configure the HE AP to transmit the schedule of the one or more schedules on the corresponding channel of the plurality of channels.

24. The non-transitory computer-readable storage medium of claim 23, wherein each of the plurality of schedules comprises a schedule type and a user association identification (AID) list.

25. An apparatus of a high-efficiency (HE) access point (AP), the HE AP comprising: memory; and, processing circuitry coupled to the memory, the processing circuitry to:

determine a plurality of schedules for each of a plurality of channels for an orthogonal frequency division multiple access (OFDMA) communication in a wireless local-area network (WLAN), wherein each of the plurality of schedules comprise a frequency allocation for one or more HE stations; and configure the HE AP to transmit the schedule of the one or more schedules on the corresponding channel of the plurality of channel, wherein each of the plurality of schedules comprises a fixed number of user association identifications (AIDs), wherein a bandwidth allocation is indicated by a position of each of the AIDs of the fixed number of AIDs, and wherein each of the plurality of schedules is a schedule for each of the plurality of channels and for each of one or more spatial streams associated with the each of the plurality of channels.

26. The HE AP of claim 25, the HE AP further comprising: transceiver circuitry coupled to the memory; and, one or more antennas coupled to the transceiver circuitry.

* * * * *